United States Patent [19]

Hagiwara et al.

[11] 4,304,539

[45] Dec. 8, 1981

[54] EXTRUDER WITH ROLLER DIE

[75] Inventors: Katsunobu Hagiwara; Kazuhiko Nakagawa, both of Kobe, Japan

[73] Assignee: Kobe Steel, Ltd., Kobe, Japan

[21] Appl. No.: 158,312

[22] Filed: Jun. 10, 1980

[30] Foreign Application Priority Data

Jun. 12, 1979 [JP] Japan .................................. 54-74406

[51] Int. Cl.³ ............................................ B29F 3/012
[52] U.S. Cl. .................................. 425/145; 264/40.7;
  264/175; 264/176 R; 366/88; 425/147;
  425/149; 425/208; 425/327; 425/363; 425/376
  B; 425/DIG. 235
[58] Field of Search ................... 425/208, 378 R, 209,
  425/379, 376 B, 376 R, 327, DIG. 235, 363,
  145, 147, 149, 367, 325; 264/175, 176 R, 40.7;
  366/79, 88

[56] References Cited

U.S. PATENT DOCUMENTS

| | | | |
|---|---|---|---|
| 3,274,645 | 9/1966 | Chase | 425/367 |
| 3,359,597 | 12/1967 | Bainton | 425/DIG. 235 |
| 3,393,426 | 7/1968 | Meienberg | 425/209 |
| 3,482,279 | 12/1969 | Anders et al. | 425/192 R |
| 3,543,333 | 12/1970 | Anders et al. | 264/175 |
| 3,694,120 | 9/1972 | Walton | 425/381 |
| 3,932,086 | 1/1976 | Kasamatsu | 425/208 |
| 3,947,201 | 3/1976 | Ellwood | 425/376 R |
| 3,954,366 | 5/1976 | Fields | 425/208 |
| 4,028,031 | 6/1977 | Seide | 425/327 |

FOREIGN PATENT DOCUMENTS 971776 3/1959 Fed. Rep. of Germany .

Primary Examiner—Jeffery R. Thurlow
Attorney, Agent, or Firm—Oblon, Fisher, Spivak, McClelland & Maier

[57] ABSTRACT

An extruder with a roller die in which a plastic or rubber material fed from a mixer is formed into a sheet by a roller die located at the fore end of a screw feeder which includes a cylinder and a revolving screw, the screw feeder employing a short screw shaft which has its base portion rotatably supported in the cylinder and a non-contacting screw portion essentially including a feed portion and a compression portion and disposed in the cylinder with a small gap being formed between the screw portion and the inner periphery of the cylinder. The pressure distribution in the screw feeder is controlled such that the maximum pressure in a compression zone and the pressure at the fore end of the cylinder are maintained in the ranges of $52 \times 10^3$ to $200 \times 10^3$ gr/cm² and $20 \times 10^3$ to $60 \times 10^3$ gr/cm², respectively.

3 Claims, 4 Drawing Figures

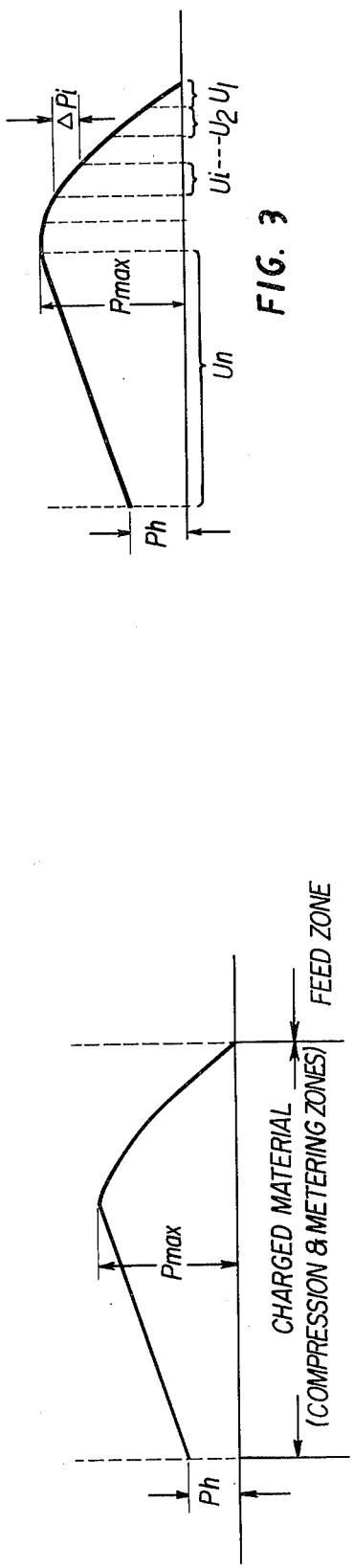
FIG. 3
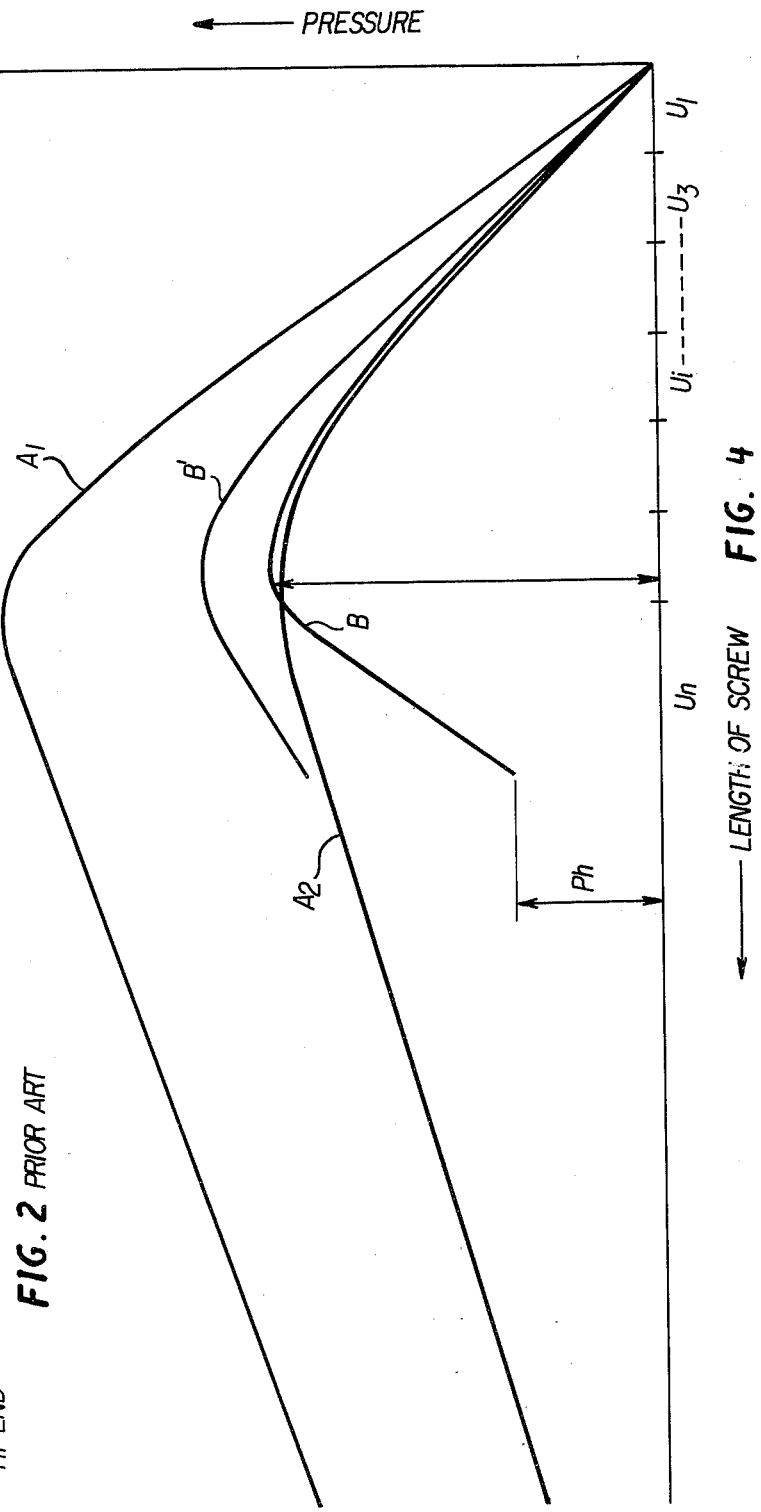
FIG. 2 PRIOR ART
FIG. 4

EXTRUDER WITH ROLLER DIE

BACKGROUND OF THE INVENTION

1. Field of the Invention

This invention relates to an improvement in and relating to an extruder with a roller die.

2. Description of Prior Art

In a conventional extruder with a roller die, material which is discharged from a batch type mixer is fed into a chute of a hopper and forced into a cylinder by a pusher. The material is further fed forward by a screw which is rotated in the cylinder, toward a bank portion of a pair of horizontally disposed roller dies which are located at the front end of the extruder, and rolled into a sheet. The rear or base end of the screw is keyed or splined to and rotatingly driven by an output shaft of a reducer while the fore end portion of the screw is contacted and supported by the inner periphery of the cylinder. There arises no problem as long as the screw is maintained exactly in the center position within the cylinder and the trough of the screw is uniformly loaded with the feed material. However, in the actual operations, such an ideal condition is not expected and, in spite of antifrictional treatment, the fore end portion of the screw is subjected to considerable abrasive wear due to contact with the inner periphery of the cylinder during rotation. Therefore, early repair and replacement of parts are required in the maintenance and service of the machine.

In the conventional extruder of this class, the screw usually has a feed portion, a compression portion and a metering portion, such metering portion serving to generate a high pressure in the fore end portion of the extruder and extrude the material at a constant rate against the generated pressure and without pulsations. Therefore, the metering portion has been considered to be essential to extruders. However, in an extruder with a roller die, the fore end of the extruder is opened into the bank portion of the roller die, so that there is no necessity for correctly metering the feed material and it suffices to maintain a feed pressure and an accuracy which ensure the feed material to be rolled into a continuous sheet by the roller die. That is to say, the metering function is not required as strictly as in the extruders of other types (e.g., extruders with a pelletizer or a sheeting die). Therefore, an extruder with a roller die can dispense with the metering portion if the rolling and extruding speeds are controlled in such a manner as to ensure continuous sheet formation on the basis of the amount or pressure of the bank of the roller die.

The extruding material within the extruder has a pressure distribution as shown in the graph of FIG. 2. It is known therefrom that the discharge capacity of the screw which is fully loaded with the material is not constant and gradually reduces forwardly in the compression portion. On the other hand, the flow rate of the loaded material tends to be reduced and increased on the sides of the larger and smaller discharge capacities, respectively, under the influence of the pressure difference thereby maintaining the continuity of the flow rate. Normally, the pressure $P_h$ at the fore end of the cylinder is smaller than the maximum pressure $P_{max}$ which is generated by the difference in discharge capacity, the pressure decreasing linearly therebetween showing a pressure distribution curve as in FIG. 2. As for an operating range, such is conditional to maintain the pressure at the fore end of the cylinder at a level between a minimum allowable value for the sheet formation and a maximum allowable value in terms of the mechanical strength of the extruding material, and to maintain the maximum pressure $P_{max}$ at a level between a minimum allowable value which keeps the sheet free of pores and bubbles and a maximum allowable value in terms of the mechanical strength. These pressures are important factors which influence the quality of the sheet to be produced. The pressures $P_h$ and $P_{max}$ are varied depending upon the viscosity of the extruding material, normally being in proportion thereto. Nevertheless, no attention has been paid to the control of these pressures in the conventional extruders of the class mentioned above.

SUMMARY OF THE INVENTION

With the foregoing in view, the present invention has as its object the provision of an extruder with a roller die which employs a non-contacting cantilever type screw shaft having its screw portion forming small gap in relation to the inner peripheral surface of the cylinder so as to preclude the problem of abrasive wear.

Another object of the present invention is to provide an extruder with a roller die in which the maximum pressure in a compression zone and the pressure at the fore end of the cylinder are maintained in particular ranges to ensure stable sheet-forming operation.

Still another object of the present invention is to provide an extruder with a roller die which is advantageous costwise and from the standpoint of maintenance and service.

According to the present invention, an extruder with a roller die is provided for forming a plastic or rubber material into a sheet by a roller die which is located at the fore end of a screw feeder including a cylinder and a revolving screw, the screw feeder including a screw shaft having a driven base portion thereof rotatably supported in the cylinder and a short non-contacting screw portion essentially including a feed portion and a compression portion and disposed in the cylinder forming a small gap relation with respect to the inner peripheral surface thereof.

In order to ensure stable sheet-forming operation without rejects, the maximum pressure in the compression zone of the screw feeder and the pressure at the fore end of the cylinder are maintained in the ranges of $52 \times 10^3$ to $200 \times 10^3$ gr/cm$^2$ and $20 \times 10^3$ to $60 \times 10^3$ gr/cm$^2$, respectively.

With an extruding material with a viscosity of ML 75 to ML 90, the above-mentioned maximum pressure and fore end pressure are maintained in the desired ranges of $52 \times 10^3$ to $120 \times 10^3$ gr/cm$^2$ and $20 \times 10^3$ to $60 \times 10^3$ gr/cm$^2$, respectively.

The above and other objects, features and advantages of the invention will be apparent from the following description and the appended claims, taken in conjunction with the accompanying drawings which show by way of example a preferred embodiment of the invention.

BRIEF DESCRIPTION OF THE DRAWINGS

In the accompanying drawings:

FIG. 2 is a graphic representation of pressure distribution of an extruding material in conventional roller die extruder;

FIG. 3 is a graphic representation of pressure distribution in the extruder according to the invention, showing the fore end pressure, the maximum pressure and a pressure difference across a segmental zone; and FIG. 4 is a graph showing the pressure distribution in the extruder of the invention in comparison with the outer portion of the conventional extruder.

DETAILED DESCRIPTION OF THE PREFERRED EMBODIMENTS

Figure 1:
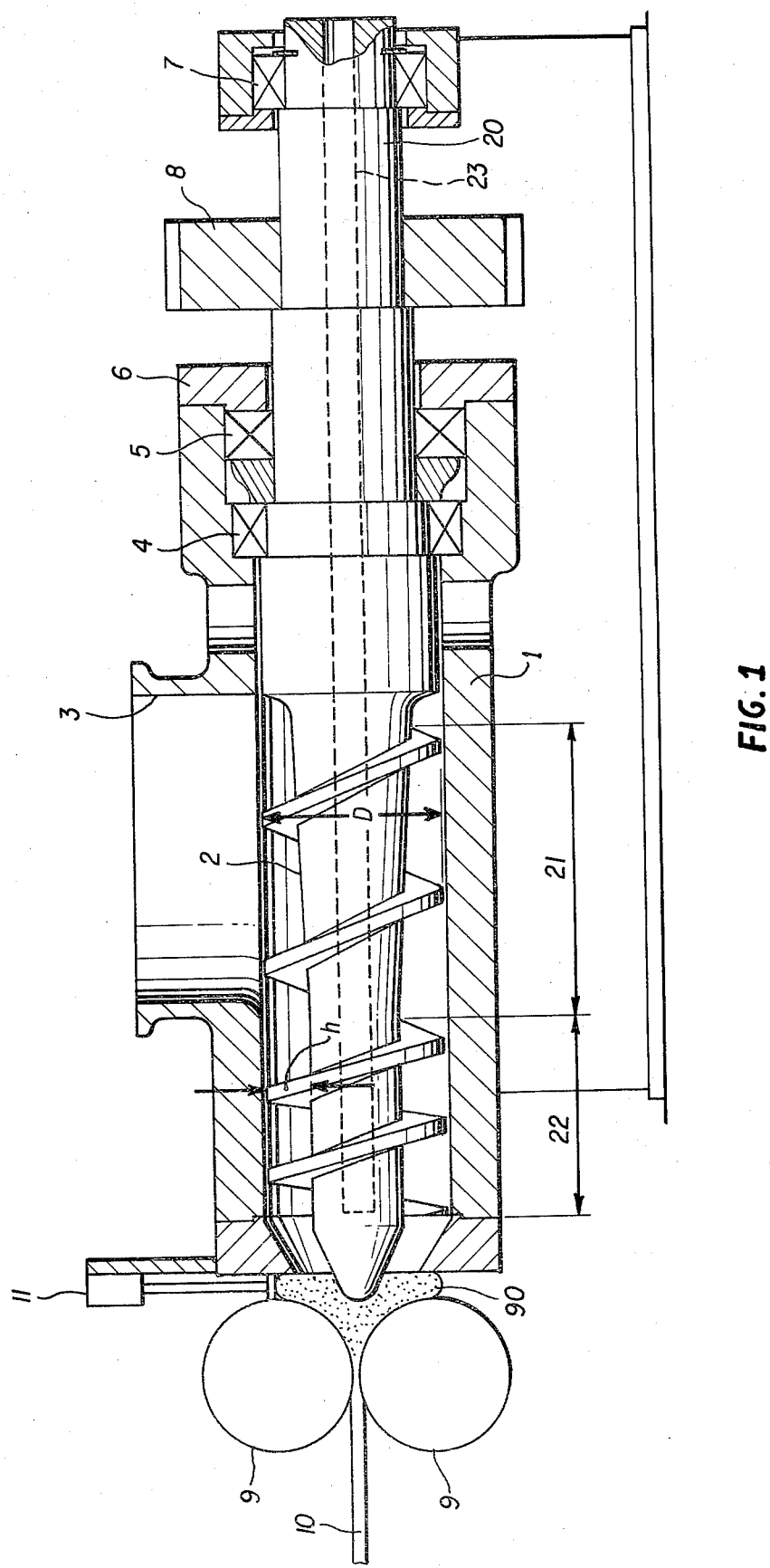
FIG. 1 is a diagrammatic sectional view of a roller die extruder according to the present invention.

Referring to FIG. 1, there is shown an extruder for a roller die, which includes a cylinder 1, a screw shaft 2 and a hopper 3. The screw shaft 2 has its base portion supported by thrust and radial bearings 4 and 5. The driven end portion 20 of the screw shaft 2 which projects out of the cylinder 1 is provided with a gear 8 and supported by a bearing 7. The gear 8 is meshed with a drive gear (not shown) for rotating the screw shaft 2. The screw shaft 2 is provided with an axial bore 23 for passing heating or cooling medium, the bore 23 opening at the rear end of the screw shaft 2. Indicated by reference numeral 9 is a roller die and by 6 is a bearing gland.

The screw shaft 2 is supported at the base and rear end portions by the bearings 4 and 5 and the bearing 7, respectively, and provided with a cantilever type screw portion which is includes a feed portion 21 and a compression portion 22 and which is extended through the cylinder 1 without contacting the inner periphery thereof. As previously mentioned, the conventional screw shaft has a metering portion forward of the compression portion and is also supported at its fore end by contacting engagement with the inner periphery of the cylinder. In the present invention, the metering portion is omitted and a shortened screw shaft is disposed within the cylinder to form a small gap with the inner peripheral surface of the cylinder so that the screw shaft is exempted from the abrasive wear and is less susceptible to shuddering during rotation and thus is advantageous from the standpoint of production cost, maintenance and service.

The material which is fed to the compression portion 22 from the hopper 3 through the feed portion 21 is extruded from the fore end of the cylinder 1 into the bank portion 90 of the roller die 9 and thereby formed into a continuous sheet 10. In this instance, the amount of the material which is fed to the bank portion 90 is not controlled as accurately as by a screw with a metering portion, but no problem occurs in this regard as long as the material is fed to the bank portion 90 in an amount corresponding to the sheet-forming speed of the roller die 9. Indicated by reference numeral 11 is a member for measuring the pressure of the feed material at bank portion 90.

The screw shaft is interiorly supplied with heating or cooling medium depending upon the kind of the material to be extruded or for the purpose of warm-up prior to the operation. The conventional practice in this regard has been to connect pipes of heating and cooling media to the rear end of the screw through a bore in the output shaft of the reducer and a rotary joint, so that the reducer has been required to be of a particular shape so as to permit such piping. In the present invention, the rear end of the screw shaft is exposed to the outside and is directly connectible to a rotary joint without requiring use of a reducer of a particular design. Further, in the above-described embodiment, it is not necessary to provide a thrust bearing in the reducer since the screw shaft 2 is supported by the thrust and radial bearings 4 and 5 on the cylinder 1 and the thrust force is born by the extruder itself.

With the extruder of the above-described construction, the material which is fed to the compression zone 22 from the hopper 3 through the feed zone 21 is forced into the bank portion 90, undergoing pressure variations due to variations in the discharge capacity and is formed into a continuous sheet by the roller die 9. In this case, formation of a sheet of satisfactory quality becomes possible by controlling the maximum pressure $P_{max}$ of the compression zone 22 in relation with the fore end pressure $P_h$ to the levels falling in the following operating ranges which have been revealed from theoretical analysis explained hereinafter. The control of the just-mentioned pressures can be attained through adjustment of rolling and extruding speeds or through adjustment or control of structural or operating elements which are related with the pressures.

For determining the appropriate ranges of the maximum pressure $P_{max}$ of the compression zone 22 and the pressure $P_h$ at the fore end of the cylinder in the pressure distribution of the material within the extruder, which qualitatively takes the form of FIG. 3 according to the graph of FIG. 2, it is an absolute operational condition of the present invention to have the fore end pressure $P_h$ at a level between a minimum allowable pressure for the sheet formation and a maximum allowable pressure in terms of the mechanical strength of the extruding material and the maximum pressure $P_{max}$ at a level between a minimum allowable pressure which keeps the sheet free of pores and bubbles and a maximum allowable pressure in view of the mechanical strength and heat generation of the material.

In the graph of FIG. 3, the cylinder portion which is charged with the extruding material is divided into a number of segmental zones $U_i = U_1, U_2 \ldots, U_n$. A pressure difference $\Delta P_i$ which occurs across an arbitrary zone $U_i$ is positive up to the value of the maximum pressure $P_{max}$ and becomes negative thereafter.

On the other hand, the relation between the discharge amount Q of rubber and the zone pressure difference $\Delta P$ is expressed by the following general formula.

$$Q = \alpha N - \beta \frac{\Delta P}{\mu_h} - \gamma \frac{\Delta P}{\mu_\delta}$$

$\alpha = \pi D_h(t - ne) \cos^2 \phi / 2$
$\beta = h^3(t - ne) \sin \phi \cos \phi / 12L$
$\gamma = \pi^2 D^2 \delta^3 \tan \phi / 10 \, eL$ in which $\alpha N$ is the propelling flow; $\beta \Delta P/\mu_h$ is the back pressure flow; $\gamma \Delta P/\mu_\delta$ is the leaking flow; D is the outer diameter of the screw; n is the depth of the screw trough (cm); t is the pitch (cm); n is the number of threads; e is the width of the thread (cm); $\phi$ is the angle of torsion ($=\tan^{-1} t/\pi D$); L is the length of the zone (cm); $\delta$ is the clearance at the crest (cm); N is the number of revolutions per second (Rev/sec); $\Delta P$ is the pressure difference across the zone (g/cm$^2$); $\mu_h$ is the viscosity of the material in the groove (g.sec/cm$^2$); and $\mu_\delta$ is the viscosity of the material at the crest (g.sec/cm$^2$).

The values of $\mu_h$ and $\mu_\delta$ are obtained from the viscosity of the material (rubber) which is governed by the Power Law and expressed by the general formula $[\mu = a \cdot \dot{\gamma} n]$, a viscosity curve of rubber based on various experimental data, here, a viscosity curve with ML (viscosity) of 82.7 and SMR (temperature of natural rubber) of 98° C., and $\dot{\gamma}_h$ and $\dot{\gamma}_\delta$ ($\dot{\gamma}_h$ stands for $\dot{\gamma}$ in the middle portion of the groove and $\dot{\gamma}_\delta$ for $\dot{\gamma}$ at the tip portion), as follows, $$\mu_{hi} = \frac{1}{980} \times 2.1217 \times 10^6 \times \left(\frac{\pi D_i N}{h_i}\right) - 0.8572$$

$$\mu_{\delta i} = \frac{1}{980} \times 2.1217 \times 10^6 \times \left(\frac{\pi D_i N}{\delta_i}\right) - 0.8572$$

In filling the trough of the screw with rubber, if the total discharge amount (flow rate) of the screw is $Q'$, the discharge capacity in the feed portion is $\alpha_o N$ and the clogging of rubber in the feed zone is greater than $\frac{1}{3}$ (experimental value), rubber is filled up to a point immediately downstream of the hopper in a case where $$[\, Q' \geq \alpha_o N \times \tfrac{1}{3}\,].$$

Since the total flow rate $Q'$ (constant) is $$Q' = \alpha_i N - \beta_i \frac{\Delta P_i}{\mu_{hi}} - \gamma_i \frac{\Delta P_i}{\mu_{\delta i}}$$

the pressure difference $\Delta P_i$ across a given segmental zone $U_i$ is $$\Delta P_i = (\alpha_i N - Q')/\left(\frac{\beta_i}{\mu_{hi}} + \frac{\gamma_i}{\mu_{\delta i}}\right)$$

$$= \frac{\pi D_i h_i (t_i - n_i e_i) N \cos^2 \phi_i / 2 - Q'}{\dfrac{h_i^3 (t_i - n_i e_i) \sin\phi_i \cos\phi_i / 12 L_i}{\mu_{hi}} + \dfrac{\pi^2 D_i^2 \delta_i^3 \tan\phi_i / 10 e_i L_i}{\mu_{\delta i}}}$$

In the foregoing equation, it was allowed that $n_i = 1$, $i = 2.2$ and $N = 0.33$. The predetermined values of $\mu_{hi}$ and $\mu_{\delta i}$ are substituted and $D_i$, $t_i$, $\phi_i$, $h_i$, $\delta_i$ and $L_i$ are taken from the particular values given in the conditions (1), (2) and (3) listed in the following table. In the respective conditions, the values of $\Delta P_i$ where $$P_h \left( = \sum_{x=1}^{n} \Delta P_i \right)$$

is $20 \times 10^3$ g/cm² (minimum) and $60 \times 10^3$ g/cm² maximum are shown at the bottom of the columns of the respective conditions.

The pressure difference $\Delta P_i$ for each zone is calculated in the following manner to obtain $P_{max}$:

$$P_{max} = \sum_{i=1}^{R} \Delta P_i$$

(R is a point where $P_R \geq 0$ and $P_{R+1} < 0$ are satisfied.) Conditions (1) and (2) of the following table are of the conventional extruders, of which condition (1) involves no abrasive wear and condition (2) involves abrasive wear of a certain amount. In any case, no problem occurs in the sheet formation. The values of $\Delta P_i$ and $P_{max}$ vary substantially in proportion to the viscosity of the extruding material and are influenced by the rotational speed or revolutions per second N of the extruder shaft.

According to the afore-mentioned viscosity curve, the influence of N is $$\Delta P = N^{0.1428} \times (\alpha - \alpha')/\left(\frac{\beta}{\mu_h'} + \frac{\gamma}{\mu_\delta'}\right)$$

where
$Q' = \alpha' N$
$\mu_h' \cdot N^{-0.8572} = \mu_h$
$\mu_\delta' N^{-0.8572} = \mu_\delta$
and, if the extruding condition is constant, $\Delta P$ is proportional to the 0.1428th power of N. Further, with regard to the machine size, it is presumable that screws of similar dimensions have similar values of $\Delta P_i$ and $P_{max}$.

In consideration of the pressure analysis in conditions (1) and (2) which are free of the sheet-forming problems and the influences of other factors mentioned above, when the fore end pressure $P_h$ is set at $20 \times 10^3 < P_h < 60 \times 10^3$ gr/cm², the maximum pressure $P_{max}$ appropriate for the sheet formation is $52 \times 10^3 < P_{max} < 200 \times 10^3$ gr/cm². In particular, in the case where the viscosity of the material to be extruded is in the range of ML 75 to ML 90, the maximum pressure $P_{max}$ appropriate for the sheet formation is set at $52 \times 10^3 < P_{max} < 120 \times 10^3$ gr/cm².

| Conditions | | $U_1$ | $U_2$ | $U_3$ | $U_4$ | $U_5$ | $U_6$ | $U_7$ (n) | $P_h/P_{max}$ |
|---|---|---|---|---|---|---|---|---|---|
| (1) | $D_i$ | 45.4 | 44.2 | 42.9 | 41.7 | 40.5 | 39.2 | 38.0 | |
| | $t_i$ | 43.2 | 40.2 | 37.2 | 34.2 | 31.2 | 28.2 | 25.4 | |
| | $\phi_i$ | 16.9 | 16.2 | 15.4 | 14.6 | 13.8 | 12.9 | 12.0 | |
| | $h_i$ | 11.3 | 10.6 | 10.0 | 9.4 | 8.8 | 8.2 | 7.55 | |
| | $\delta_i$ | 0.2 | 0.2 | 0.2 | 0.2 | 0.2 | 0.2 | 0.05 | |
| | $L_i$ | 7.5 | 7.5 | 7.5 | 7.5 | 7.5 | 7.5 | 76 | |
| | $\Delta P_i (Q'/N = 11000)$ | 21.04 | 21.08 | 20.40 | 18.47 | 14.46 | 6.89 | −82.0 | 20.34/102.34 |
| | $\Delta P_i (Q'/N = 10600)$ | 21.48 | 21.65 | 21.14 | 19.46 | 15.80 | 8.77 | −50.6 | 57.7/108.3 |
| (2) | $D_i$ | 45.1 | 43.9 | 42.6 | 41.4 | 40.2 | 38.9 | 37.2 | |
| | $t_i$ | 43.2 | 40.2 | 37.2 | 34.2 | 31.2 | 28.2 | 25.4 | |
| | $\phi_i$ | 16.9 | 16.2 | 15.4 | 14.6 | 13.8 | 12.9 | 12.3 | |
| | $h_i$ | 11.0 | 10.3 | 9.7 | 9.1 | 8.5 | 7.9 | 7.15 | |
| | $\delta_i$ | 0.5 | 0.5 | 0.5 | 0.5 | 0.5 | 0.5 | 0.9 | |
| | $L_i$ | 7.5 | 7.5 | 7.5 | 7.5 | 7.5 | 7.5 | 76 | |
| | $\Delta P_i (Q'/N = 11580)$ | 15.60 | 14.81 | 13.43 | 11.02 | 7.13 | 1.34 | −42.9 | 20.43/63.33 |
| | $\Delta P_i (Q'/N = 10200)$ | 16.81 | 16.35 | 15.38 | 13.49 | 10.30 | 5.50 | −17.46 | 60.37/77.83 |
| 3 | $D_i$ | 45.2 | 44.0 | 42.7 | 41.5 | 40.3 | 39.0 | 38.0 | |
| | $t_i$ | 43.2 | 40.2 | 37.2 | 34.2 | 31.2 | 28.2 | 26.4 | |

-continued

| Conditions | | $U_1$ | $U_2$ | $U_3$ | $U_4$ | $U_5$ | $U_6$ | $U_7$ (n) | $P_h/P_{max}$ |
|---|---|---|---|---|---|---|---|---|---|
| | $\phi_i$ | 16.9 | 16.2 | 15.4 | 14.6 | 13.8 | 12.9 | 12.5 | |
| | $h_i$ | 11.1 | 10.4 | 9.8 | 9.2 | 8.6 | 8.0 | 7.55 | |
| | $\delta_i$ | 0.4 | 0.4 | 0.4 | 0.4 | 0.4 | 0.4 | 0.42 | |
| | $L_i$ | 7.5 | 7.5 | 7.5 | 7.5 | 7.5 | 7.5 | 14 | |
| | $\Delta P_i(Q'/N = 12730)$ | 16.35 | 15.43 | 13.74 | 10.76 | 5.80 | −2.24 | −38.92 | 20.92/ 62.08 |
| | $\Delta P_i(Q'/N = 11400)$ | 17.64 | 17.08 | 15.85 | 13.49 | 9.37 | 2.54 | −16.75 | 59.22/ 75.97 |

FIG. 4 shows the pressure distribution of an extruder using the short non-contacting type screw of the present invention, in comparison with the pressure distribution of an extruder using a conventional long contacting type screw. In this graph, curve $A_1$ indicates the pressure distribution of the conventional extruder before abrasive wear of the screw and when $P_h$ is maximum ($P_{max}$ maximum), and curve $A_2$ indicates the pressure distribution of the same extruder after abrasive wear of the screw when $P_h$ is at a minimum ($P_{max}$ minimum). As mentioned hereinbefore, the shape of the conventional screw changes in time due to abrasive wear resulting from the contact with the inner periphery of the cylinder. It is known by experience that a certain amount of abrasion causes no trouble with regard to sheet formation. Curve $A_2$ is a plot of the pressure distribution after a certain amount of abrasion. In the graph of FIG. 4, curve B is the pressure distribution of the extruder according to the present invention when $P_h$ is at a minimum and curve B' is the pressure distribution when $P_h$ is at a maximum. The non-contacting type extruder of the invention which is exempted from the problem of abrasive wear and the variations in pressure distribution allows appropriate control of the pressure. It will also be clear from the graph that the short screw can control the maximum pressure $P_{max}$ of the compression portion and the fore end pressure $P_h$ as well as in the normal operating condition of the conventional extruder with a long contacting type screw.

The short non-contacting type screw also contributes in precluding the shuddering movements of the screw shaft which are caused by deflections during rotation and in providing an extruder of a compact construction which is advantageous costwise and for maintenance and service.

Further, according to the theoretical analysis given hereinbefore, with an extruding material of a viscosity of ML 75 to ML 90, operating conditions appropriate for the sheet formation can be obtained by maintaining the maximum pressure of the compression portion in the range of $52 \times 10^3$ to $120 \times 10^3$ gr/cm² and the fore end pressure in the range of $20 \times 10^3$ to $60 \times 10^3$ gr/cm².

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An extruder with a roller die in which a plastic or rubber material fed from a mixer is formed into a sheet, said extruder comprising:
   a screw feeder having said roller die located at the fore end thereof, said screw feeder comprising:
   a cylinder:
   a revolving screw;
   a variable pitch screw shaft including a driven base portion thereof rotatably supported in said cylinder and a non-contacting screw portion forming a feed portion and a compression portion and which is disposed in said cylinder so as to form a small gap with respect to the inner periphery of said cylinder; and
   means for maintaining the maximum pressure of the extruding material in said compression portion and the pressure at the fore end of said screw feeder in the ranges of $52 \times 10^3$ to $200 \times 10^3$ gr/cm² and $20 \times 10^3$ to $60 \times 10^3$ gr/cm², respectively, said means for maintaining said pressure further comprising means for measuring said pressure of said material at a position between said roller die and said screw feeder.

2. An extruder as defined in claim 1, said maintaining means further comprising means for maintaining the maximum pressure of the extruding material in the compression zone and the pressure at the fore end of said screw feeder in the ranges of $52 \times 10^3$ to $120 \times 10^3$ gr/cm² and $20 \times 10^3$ to $60 \times 10^3$ gr/cm², respectively, upon extrusion of said material wherein said material has a viscosity of ML 75 to ML 90.

3. An extruder as defined in claims 1 or 2, said variable pitch screw shaft further comprising a continuous thread.

* * * * *